United States Patent
Xiong et al.

(10) Patent No.: US 12,154,219 B2
(45) Date of Patent: Nov. 26, 2024

(54) METHOD AND SYSTEM FOR VIDEO TRANSFORMATION FOR VIDEO SEE-THROUGH AUGMENTED REALITY

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 18/052,827

(22) Filed: Nov. 4, 2022

(65) Prior Publication Data
US 2023/0410414 A1 Dec. 21, 2023

Related U.S. Application Data
(60) Provisional application No. 63/352,960, filed on Jun. 16, 2022.

(51) Int. Cl.
*G06T 15/20* (2011.01)
*G06F 3/01* (2006.01)
*G06T 5/77* (2024.01)
*G06T 7/55* (2017.01)
*G06T 19/00* (2011.01)

(52) U.S. Cl.
CPC ............ *G06T 15/20* (2013.01); *G06F 3/013* (2013.01); *G06T 5/77* (2024.01); *G06T 7/55* (2017.01); *G06T 19/006* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 9,183,669 B2 | 11/2015 | Liu et al. | |
| 11,790,498 B1* | 10/2023 | Zhang | G02B 27/0101 345/589 |
| 2014/0002591 A1* | 1/2014 | Wenxiu | G06T 5/77 348/42 |
| 2014/0333739 A1 | 11/2014 | Yang et al. | |
| 2021/0042898 A1 | 2/2021 | Wu et al. | |
| 2021/0235054 A1* | 7/2021 | Silverstein | G06F 3/013 |
| 2022/0070426 A1 | 3/2022 | Sinharoy et al. | |
| 2023/0410699 A1* | 12/2023 | Clark | G09G 3/001 |

* cited by examiner

*Primary Examiner* — Frank S Chen

(57) ABSTRACT

A method of video transformation for a video see-through (VST) augmented reality (AR) device includes obtaining video frames from multiple cameras associated with the VST AR device, where each video frame is associated with position data. The method also includes generating camera viewpoint depth maps associated with the video frames based on the video frames and the position data. The method further includes performing depth re-projection to transform the video frames from camera viewpoints to rendering viewpoints using the camera viewpoint depth maps. The method also includes performing hole filling of one or more holes created in one or more occlusion areas of at least one of the transformed video frames during the depth re-projection to generate at least one hole-filled video frame. In addition, the method includes displaying the transformed video frames including the at least one hole-filled video frame on multiple displays associated with the VST AR device.

20 Claims, 10 Drawing Sheets

METHOD AND SYSTEM FOR VIDEO TRANSFORMATION FOR VIDEO SEE-THROUGH AUGMENTED REALITY

CROSS-REFERENCE TO RELATED APPLICATION AND PRIORITY CLAIM

This application claims priority under 35 U.S.C. § 119(e) to U.S. Provisional Patent Application No. 63/352,960 filed on Jun. 16, 2022, which is hereby incorporated by reference in its entirety.

TECHNICAL FIELD

This disclosure relates generally to augmented reality (AR) devices and processes. More specifically, this disclosure relates to a method and system for video transformation for video see-through augmented reality.

BACKGROUND

Augmented reality (AR) systems can seamlessly blend virtual objects generated by computer graphics within real-world scenes. Optical see-through (OST) AR systems refer to AR systems in which users directly view real-world scenes through head-mounted devices (HMDs). Unfortunately, OST AR systems faces many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements.

SUMMARY

This disclosure relates to a method and system for video transformation for video see-through augmented reality.

In a first embodiment, a method of video transformation for a video see-through (VST) augmented reality (AR) device includes obtaining video frames from multiple cameras associated with the VST AR device, where each video frame is associated with position data. The method also includes generating camera viewpoint depth maps associated with the video frames based on the video frames and the position data. The method further includes performing depth re-projection to transform the video frames from camera viewpoints to rendering viewpoints using the camera viewpoint depth maps. The method also includes performing hole filling of one or more holes created in one or more occlusion areas of at least one of the transformed video frames during the depth re-projection to generate at least one hole-filled video frame. In addition, the method includes displaying the transformed video frames including the at least one hole-filled video frame on multiple displays associated with the VST AR device.

In a second embodiment, a VST AR device includes multiple cameras and at least one processing device. The at least one processing device is configured to obtain video frames from the cameras, where each video frame is associated with position data. The at least one processing device is also configured to generate camera viewpoint depth maps associated with the video frames based on the video frames and the position data. The at least one processing device is further configured to perform depth re-projection to transform the video frames from camera viewpoints to rendering viewpoints using the camera viewpoint depth maps. The at least one processing device is also configured to perform hole filling of one or more holes created in one or more occlusion areas of at least one of the transformed video frames during the depth re-projection to generate at least one hole-filled video frame. In addition, the at least one processing device is configured to initiate display of the transformed video frames including the at least one hole-filled video frame on multiple displays associated with the VST AR device.

In a third embodiment, a non-transitory machine readable medium contains instructions that when executed cause at least one processor of a VST AR device to obtain video frames from multiple cameras associated with the VST AR device, where each video frame is associated with position data. The non-transitory machine readable medium also contains instructions that when executed cause the at least one processor to generate camera viewpoint depth maps associated with the video frames based on the video frames and the position data. The non-transitory machine readable medium further contains instructions that when executed cause the at least one processor to perform depth re-projection to transform the video frames from camera viewpoints to rendering viewpoints using the camera viewpoint depth maps. The non-transitory machine readable medium also contains instructions that when executed cause the at least one processor to perform hole filling of one or more holes created in one or more occlusion areas of at least one of the transformed video frames during the depth re-projection to generate at least one hole-filled video frame. In addition, the non-transitory machine readable medium contains instructions that when executed cause the at least one processor to initiate display of the transformed video frames including the at least one hole-filled video frame on multiple displays associated with the VST AR device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, augmented reality (AR) systems can seamlessly blend virtual objects generated by computer graphics within real-world scenes. Optical see-through (OST) AR systems refer to AR systems in which users directly view real-world scenes through head-mounted devices (HMDs). Unfortunately, OST AR systems faces many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements.

In contrast to OST AR systems, video see-through (VST) AR systems present users with generated video sequences of real-world scenes. VST AR systems can be built using virtual reality (VR) technologies and can have various advantages over OST AR systems. For example, VST AR systems can provide wider fields of view and can provide improved contextual augmented reality. This disclosure provides a method and system for video transformation for VST AR. Among other things, the disclosed method and system can address issues such as matching and transformation of camera, eye, and rendering viewpoints; matching of fields of view between cameras and users' eyes; occlusion between virtual objects and real-world objects; registration between virtual objects and real-world objects; and matching between perception depths and real-world depths. The disclosed method and system can also improve performance and latency of AR devices.

Figure 1:
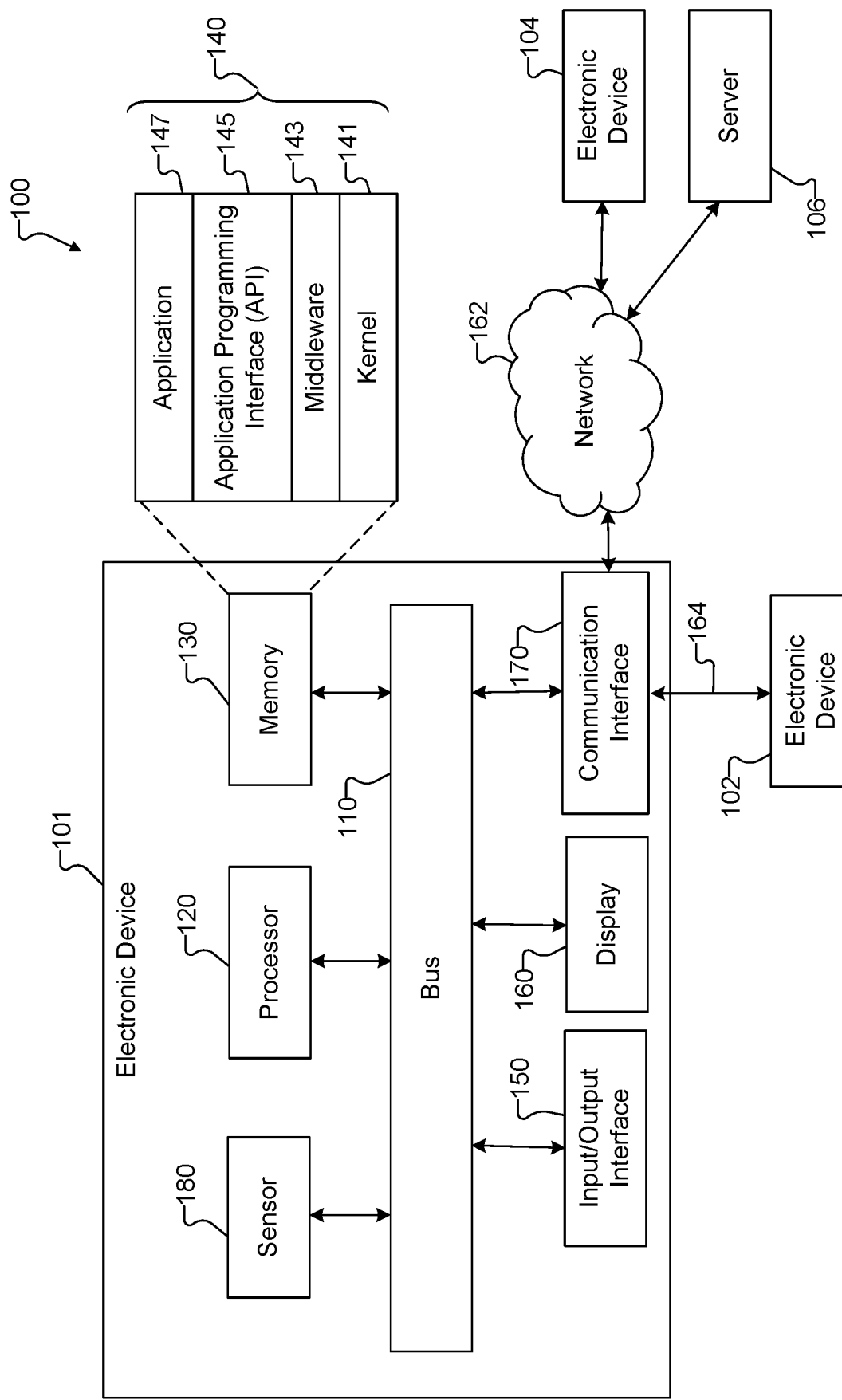
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may perform one or more functions related to video transformation of video see-through AR.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform one or more functions related to video transformation of video see-through AR. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to video transformation of video see-through AR.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
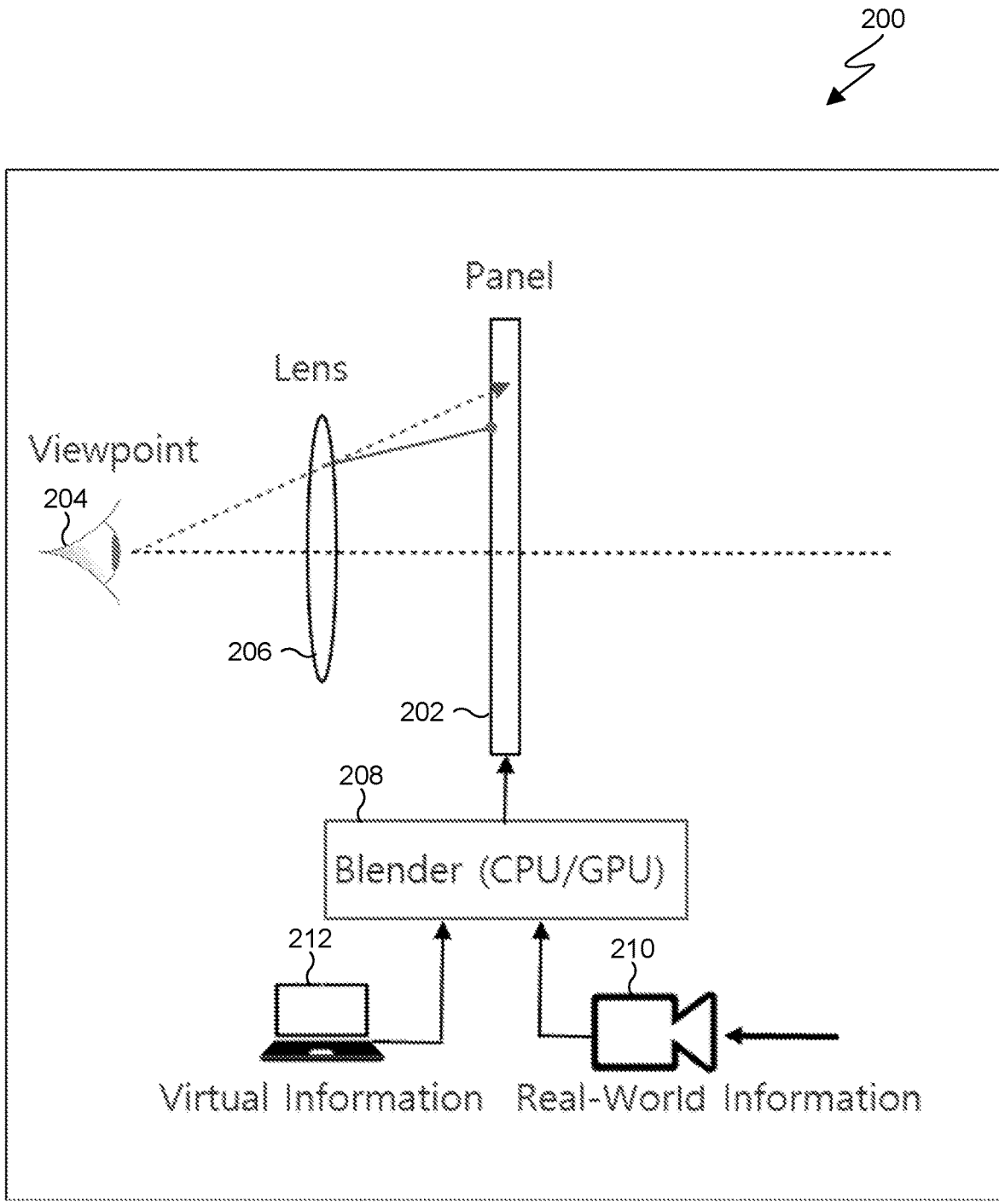
FIG. 2 illustrates an example video see-through (VST) augmented reality (AR) pipeline in accordance with this disclosure.

FIG. 2 illustrates an example VST AR pipeline 200 in accordance with this disclosure. For ease of explanation, the VST AR pipeline 200 may be described as being implemented using the electronic device 101 in the network configuration 100 of FIG. 1. However, the VST AR pipeline 200 may be used in any other suitable device(s) and in any other suitable system(s).

As shown in FIG. 2, the VST AR pipeline 200 can be used to generate and present one or more AR or VR objects on a panel 202, where the panel 202 is viewed by a user's eye 204 through a lens 206. In some embodiments, the panel 202 can be a VST AR display that is see-through with the exception of one or more projected AR or VR objects on the panel 202. Any suitable AR or VR objects may be projected onto the panel 202 here. In some embodiments, one or more AR or VR objects may be selected for presentation based on the real-world scene being viewed by the user or an application being executed on a device implementing the VST AR pipeline 200.

The VST AR pipeline 200 also incorporates a blender 208 that can receive real-world information 210 and virtual information 212 and that can process the information 210 and 212 in order to generate one or more AR or VR objects for display on the panel 202. In some cases, the real-world information 210 can include information captured from one or more sensors, such as one or more optical sensors, accelerometers, gravity sensors, ambient light sensors, proximity sensors, magnetism sensors, gyroscopes, position sensors, etc. Also, in some cases, the virtual information 212 can include information related to the one or more AR or VR objects to be presented to the user, and different virtual information 212 may be associated with different real-world information 210. The virtual information 212 may be stored on a device implementing the VST AR pipeline 200 or on another device, such as a server 106. In some embodiments, the blender 208 can represent at least one processing device, such as the processor 120. In this particular example, the blender 208 is shown as including a CPU or GPU, although other implementations of the blender 208 are possible using other types of processing devices.

Although FIG. 2 illustrates one example of a VST AR pipeline 200, various changes may be made to FIG. 2. For example, the number of various components of the pipeline 200 can vary as needed or desired. As particular examples, the VST AR pipeline 200 may include multiple panels 202 and multiple lenses 206 (such as one panel 202 and one lens 206 for each eye 204 of the user). Also, the VST AR pipeline 200 may include multiple blenders 208, such as one blender 208 per panel 202 or multiple blenders 208 per panel 202. In addition, the VST AR pipeline 200 may be used to perform any suitable video transformation process.

Figure 3A:
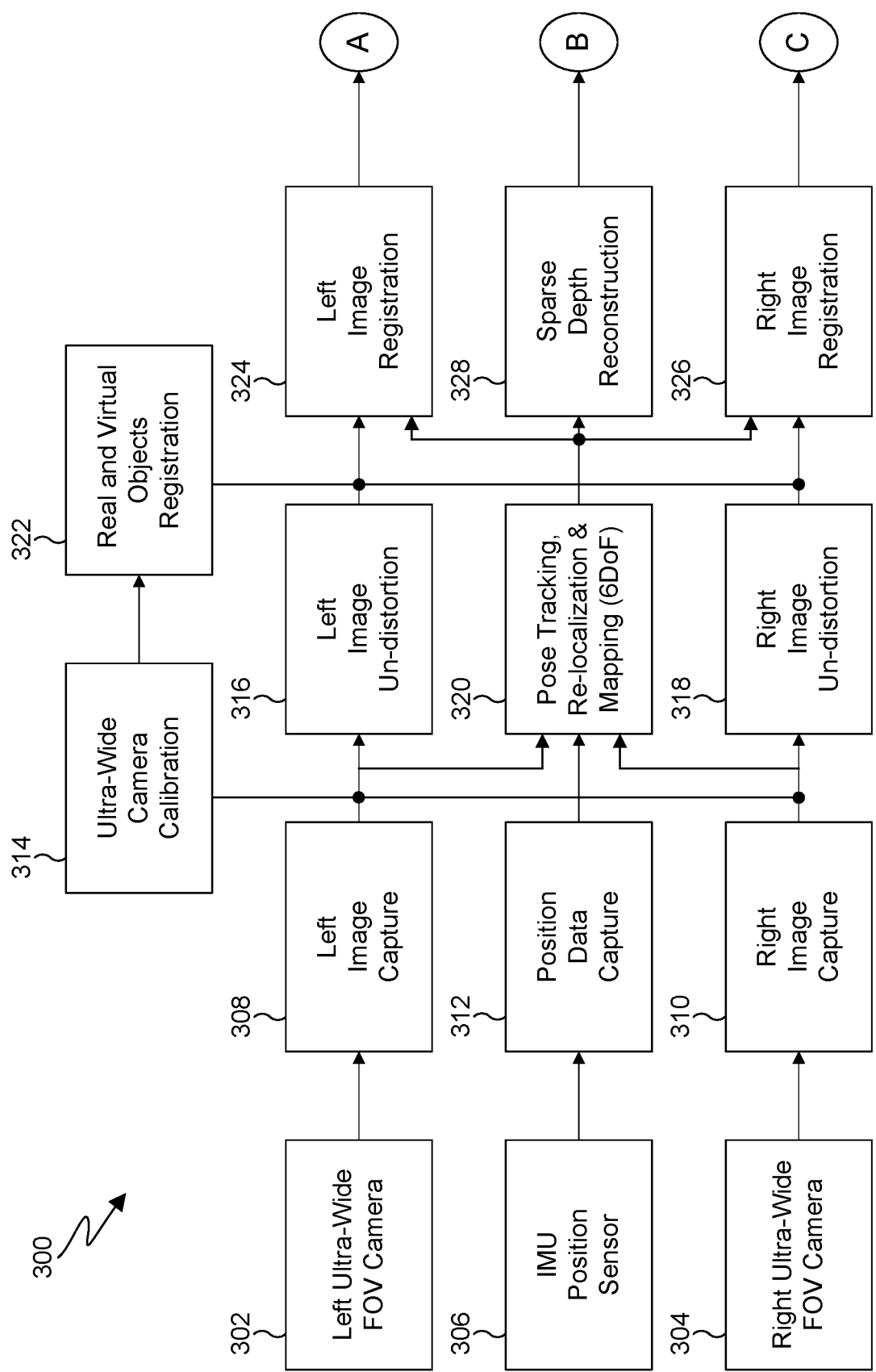
FIGS. 3A through 3C illustrate an example process for video transformation for video see-through AR in accordance with this disclosure.
Figure 3B:
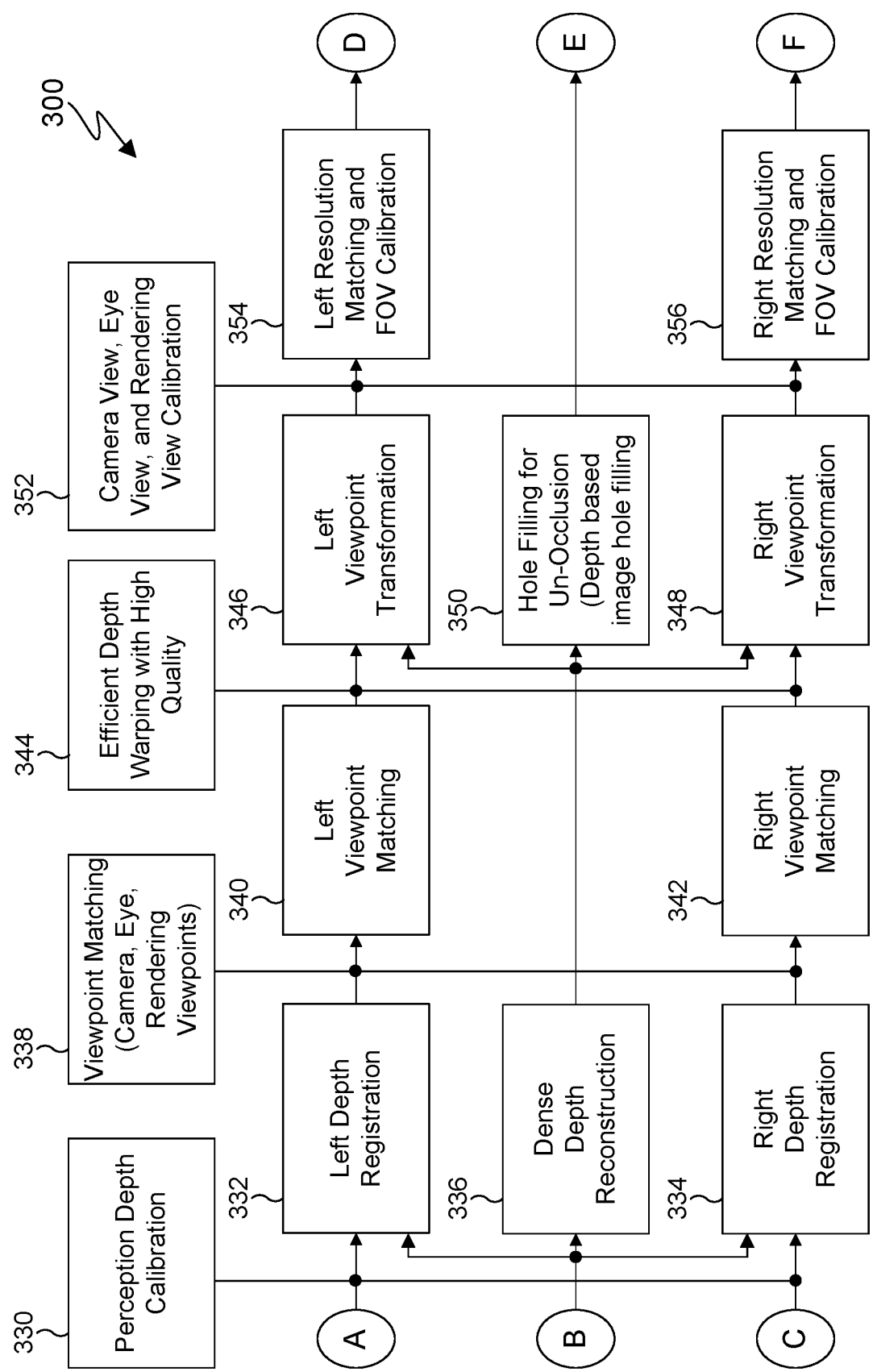
Figure 3C:
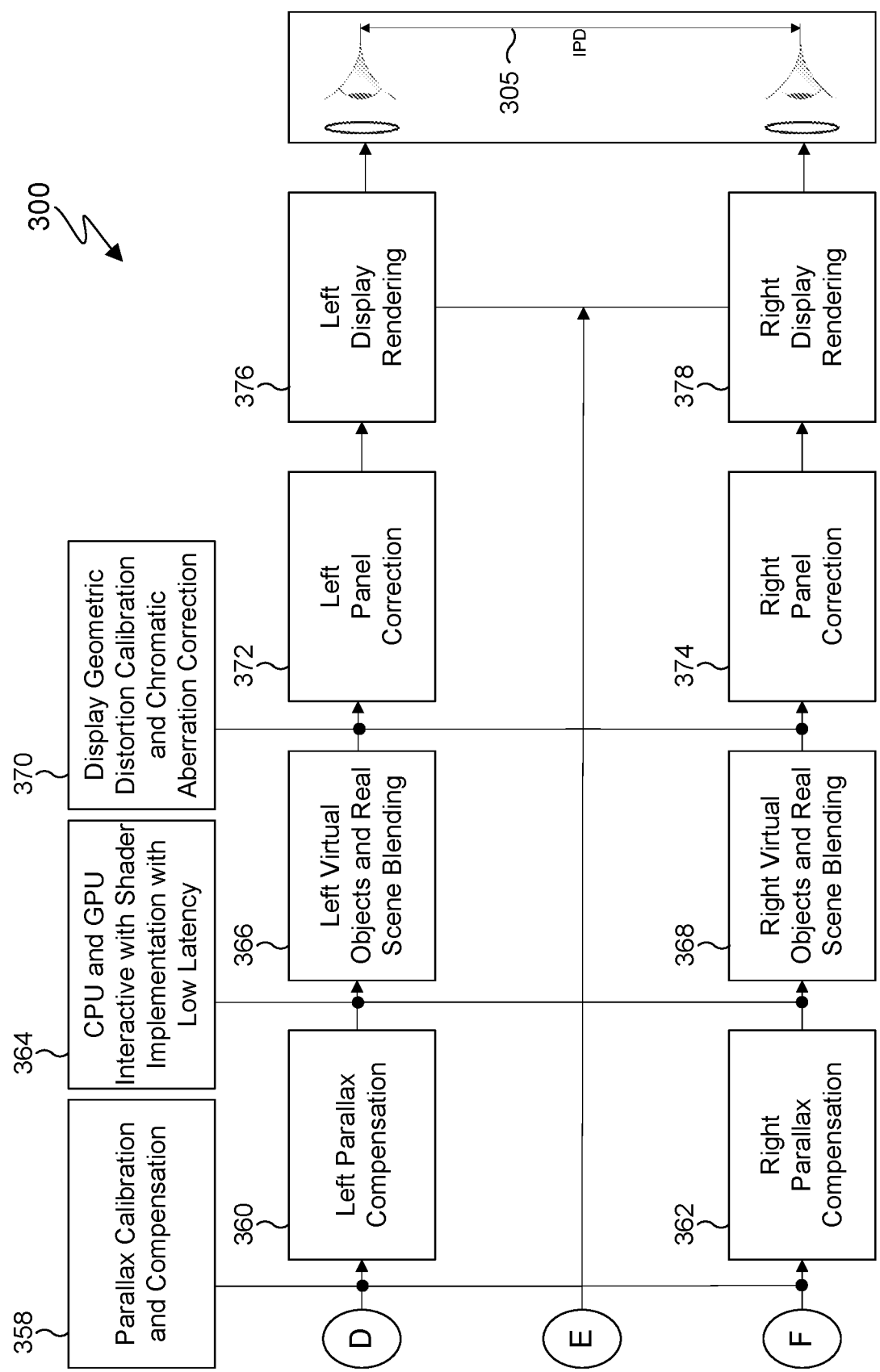

FIGS. 3A through 3C illustrate an example process 300 for video transformation for video see-through AR in accordance with this disclosure. For ease of explanation, the process 300 of FIGS. 3A through 3C is described as being performed using the electronic device 101 of FIG. 1. However, the process 300 may be used with any other suitable device(s) and in any other suitable system(s), such as when the process 300 is performed by the blender 208 of FIG. 2.

As shown in FIGS. 3A through 3C, the electronic device 101 includes first and second ultra-wide field of view (FOV) cameras 302 and 304. For example, the electronic device 101 may include one or more sensors 180 that implement the ultra-wide FOV cameras 302 and 304. A spacing between the ultra-wide FOV cameras 302 and 304 can be based on a human interpupillary distance (IPD) 305. In some embodiments, the spacing can be based on an average human IPD. In other embodiments, the spacing can be customized, such as based on the specific IPD of a given user. Also, in some embodiments, the ultra-wide FOV cameras 302 and 304 can be arranged as left and right ultra-wide FOV cameras. The electronic device 101 also includes an inertial measurement unit (IMU) position sensor 306. For instance, the electronic device 101 may include another sensor 180 that implements the IMU position sensor 306.

The ultra-wide FOV cameras 302 and 304 can respectively perform first and second image capture operations 308 and 310 in order to generate first and second images. In some embodiments, the first and second images can be left and right image captures from left and right ultra-wide FOV cameras. Also, the IMU position sensor 306 can perform a position data capture operation 312 in order to generate position data related to the first and second images. The position data can identify a position and an orientation of the electronic device 101. In some embodiments, the position and orientation of the ultra-wide FOV cameras 302 and 304 can be fixed in relation to the IMU position sensor 306.

The electronic device 101 can perform an ultra-wide camera calibration operation 314 to determine intrinsic and extrinsic parameters of the ultra-wide FOV cameras 302 and 304. The intrinsic and extrinsic parameters can be used with the first and second images to respectively perform first and second image un-distortion operations 316 and 318. The ultra-wide camera calibration operation 314 can use any suitable technique to identify intrinsic and extrinsic parameters of the ultra-wide FOV cameras 302 and 304. The image un-distortion operations 316 and 318 are performed to un-distort and rectify the first and second images. This can be done in order to subsequently blend virtual objects into the real-world. The image un-distortion operations 316 and 318 can use any suitable techniques to un-distort and rectify images. For instance, the image un-distortion operations 316 and 318 may use the intrinsic and extrinsic parameters of the ultra-wide FOV cameras 302 and 304 to un-distort and rectify the images.

The electronic device 101 can perform a pose-tracking, re-localization, and mapping operation 320 using the first and second images and the captured position data. The pose-tracking, re-localization, and mapping operation 320 can be used to identify and track the pose of the electronic device 101 over time, such as by tracking the orientation of the electronic device 101 over time. The pose-tracking, re-localization, and mapping operation 320 can also be used to re-localize the electronic device 101, which can involve identifying where the electronic device 101 is being pointed within a given space based on the current orientation of the electronic device 101. The pose-tracking, re-localization, and mapping operation 320 can further be used for mapping, which can involve identifying a point cloud or other three-dimensional (3D) mapping of the space around the electronic device 101. In some embodiments, the pose-tracking, re-localization, and mapping operation 320 can be performed using simultaneous localization and mapping (SLAM). Also, in some embodiments, the pose-tracking, re-localization, and mapping operation 320 can be performed to obtain six degree of freedom (DoF) poses and sparse 3D points from sparse reconstruction.

A real and virtual object registration operation 322 can be performed using the un-distorted first and second images and can be used to determine how to register or associate virtual objects to real-world objects. This can be performed based on real and perception positions of the virtual objects to real-world objects and relationships between the positions. First and second image registration operations 324 and 326 can be performed using the un-distorted images to compensate for misregistration of the images. For instance, the image registration operations 324 and 326 can be used to correct for registration errors caused by different physical positions of the ultra-wide FOV cameras 302 and 304. As particular examples, camera misalignment can affect stereo fusion, and vertical misalignment can degrade a final presentation of one or more virtual objects. Example details of the real and virtual object registration operation 322 are provided below. A sparse depth reconstruction operation 328 can be performed to obtain first and second sparse depth maps for the first and second images. Each sparse depth map can identify depths within a scene as captured by the images, where the depths relate to distances between the electronic device 101 and different objects or other portions of the scene around the electronic device 101.

A perception depth calibration operation 330 can be performed to identify depths in a scene as perceived by a user. These depths can be reconstructed based on the images from the ultra-wide FOV cameras 302 and 304 using the first and second sparse depth maps. Depth registration operations 332 and 334 can use the perceived depths in order to register or align the sparse depth maps, which can help to match perception depths with real-world depths.

A dense depth reconstruction operation 336 can be performed to generate first and second dense depth maps for the first and second images based on the first and second sparse depth maps. For example, a dense depth map can be generated by fusing or combining a sparse depth map and the associated captured image. In some cases, the dense depth reconstruction operation 336 can receive a current frame and output depth information corresponding to pixel points in the frame. Ideally, the dense depth reconstruction operation 336 can determine a larger amount of points of depth data for an image compared to the sparse depth reconstruction. The dense depth maps can be used for various functions, such as occlusion between virtual objects and a real-word scene, depth matching between perceptual depths and real-world scene depths, and depth re-projection in viewpoint transformations.

A viewpoint matching operation 338 can be performed to match camera viewpoints, eye viewpoints, and rendering viewpoints. For example, the viewpoint matching operation 338 may generate one or more transformations that help to match camera viewpoints, eye viewpoints, and rendering viewpoints. Example details of the viewpoint matching operation 338 are provided below. A first viewpoint matching operation 340 can match a first camera viewpoint, a first eye viewpoint, and a first rendering viewpoint, and a second viewpoint matching operation 342 can match a second camera viewpoint, a second eye viewpoint, and a second rendering viewpoint. These can be based on the one or more transformations identified by the viewpoint matching operation 338. As a particular example, because a camera and a user's eye cannot occupy the same physical space, an image captured by the camera can be modified to correct for depth and/or FOV differences from the eye's viewpoint.

A depth warping operation 344 can be performed to determine how to adjust images of certain viewpoints into images of other viewpoints, where the viewpoints are based on the viewpoint matching operations 340 and 342. For example, the depth warping operation 344 can determine how to perform warping in order to transfer one or more video frames from see-through camera positions to virtual camera positions. This can be used to generate left and right virtual views. First and second viewpoint transformation operations 346 and 348 can use the first and second sparse depth maps and the first and second dense depth maps to perform depth re-projections. For instance, each of the viewpoint transformation operations 346 and 348 can use a depth-warped frame from one of the cameras and the depth information from the sparse and dense depth maps to convert the warped frames into a viewpoint frame.

Figure 6:
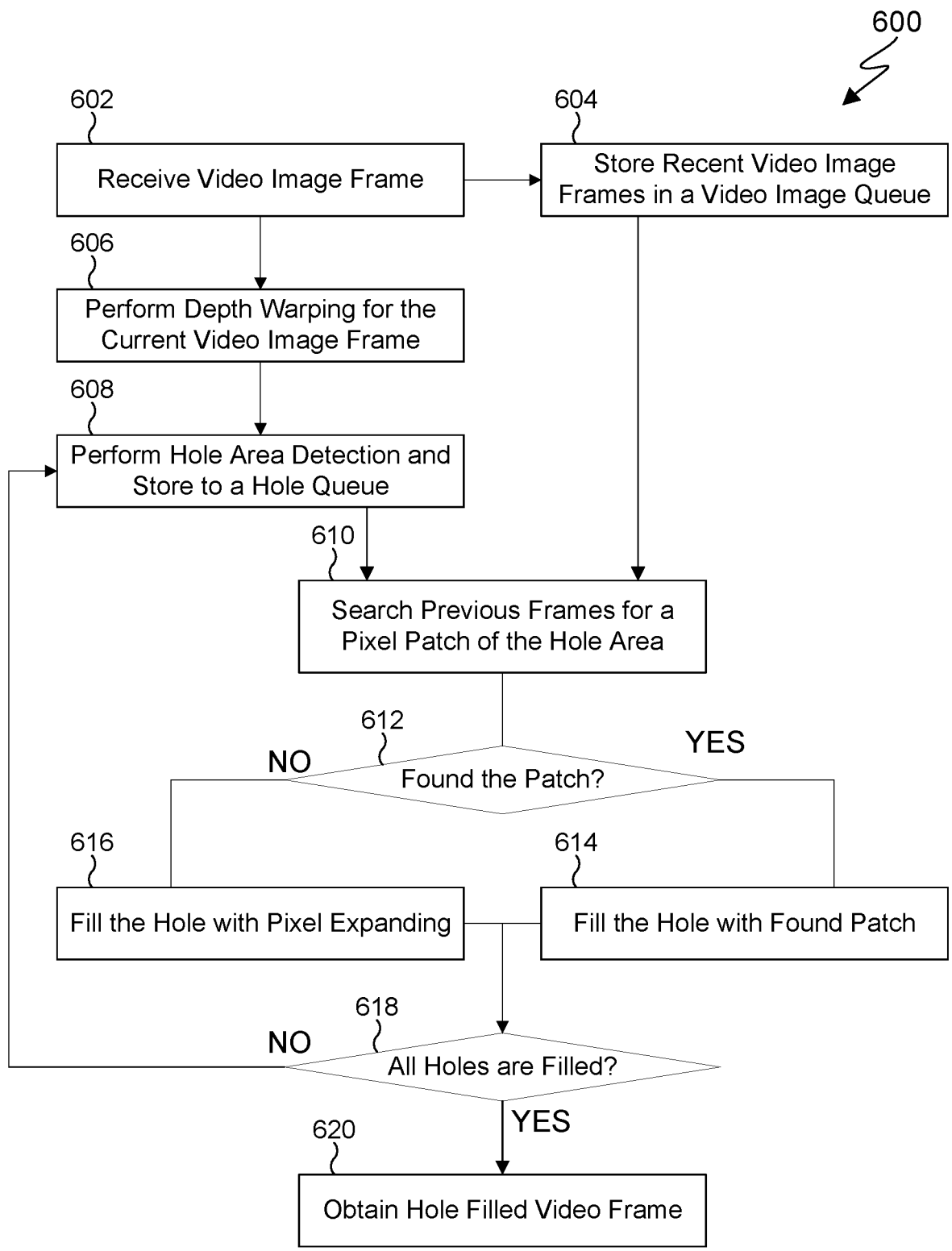
FIG. 6 illustrates an example method for image hole filling with existing information and pixel expansion in accordance with this disclosure.

A hole filling operation 350 can detect one or more holes that are created during the viewpoint matching operations 340 and 342 and determine how to fill in the hole(s). Holes or missing information can be introduced when occlusions are created by depth warping. The holes or missing information can be filled in various ways, such as pixel expansion, pixel patch replacement from previous image captures, or any other suitable technique for recovering missing information and filling hole areas. One example approach for hole filling is shown in FIG. 6.

A FOV calibration operation 352 can determine adjustments to match a resolution and FOV between a camera view and an eye or rendering view. For example, a camera typically has a wider FOV than a screen implemented on an HMD can handle. This extra-wide field of view for the camera can be by design to decrease lost information at the edges of a display frame. The adjustments determined by the FOV calibration operation 352 are performed using first and second matching and FOV calibration operations 354 and 356, which can perform the FOV calibrations for the first and second images. For instance, the electronic device 101 can use the determined adjustments from the FOV calibration operation 352 to adjust the first and second video frames from a resolution and FOV of the camera to a resolution and FOV for the frame to be display to the user's eyes.

A parallax calibration and compensation operation 358 can be performed to identify adjustments that might be needed to remove view artifacts in an overlapping area between the first and second ultra-wide FOV cameras. For example, because a camera viewpoint is not identical to eye and rendering viewpoints, objects at different depths can be distorted if adjusted equally. As a particular example, objects closer in depths to the viewpoints may be adjusted at greater rates than objects at further distances or a background of a real-world scene. The parallax calibration and compensation operation 358 can determine differences in viewing relative objects in 3D space based on line of sight. Parallax compensation operations 360 and 362 can be used correct these differences. For instance, the parallax compensation operations 360 and 362 may correct objects in the real-world scene that are affected by the parallax in the first and second frames.

A shader implementation operation 364 and first and second virtual object and real scene blending operations 366 and 368 can be used to blend virtual objects with a real-world scene. For example, the shader implementation operation 364 can calculate appropriate levels of light, darkness, and color during rendering of a 3D scene. Different shaders can describe traits of vertices or pixels, where vertex shaders can describe attributes of vertices and pixel shaders can describe attributes of pixels. For the blending operations 366 and 368, the electronic device 101 can respectively combine virtual objects into first and second video frames. The virtual objects can be positioned, oriented, and colored based on the information calculated by the shader implementation operation 364. In some cases, one or more of these operations can implement using processing on a GPU with CPU/GPU interoperability to share memory buffers between the CPU and the GPU. The blending operations 366 and 368 can use the first and second dense depth maps for occlusion between virtual objects and the real-world scene.

A geometric distortion calibration and chromatic aberration correction operation 370 and first and second panel correction operations 372 and 374 can be performed to identify and compensate for lens distortions of a VST headset. For example, the correction operation 370 can be used to identify any geometric distortions in a warped image and to remap a source image to an un-warped image as if it was taken with a perspective lens. The correction operation 370 can also calibrate an image based on known different indices of refraction across a lens, which can increase false colors in an image as distance for a pixel is further from a center of the image. Any chromatic aberrations can be corrected according to lens data and focal length information using the panel correction operations 372 and 374, where the electronic device 101 uses the information from the correction operation 370 to correct the first and second video frame based on characteristics of the first and second panels. First and second display rendering operations 376 and 378 can render first and second final video frames for display on the panel, such as the panel 202. For the rendering operations 376 and 378, the electronic device 101 can display a first video frame on a first panel and a second video frame on a second panel. Depending on the implementation, the first and second display rendering operations 376 and 378 can be pre-rendered or can be dynamically rendered.

Although FIGS. 3A through 3C illustrate one example of process 300 for video transformation for video see-through AR, various changes may be made to FIGS. 3A through 3C. For example, while shown as a series of operations, various operations in FIGS. 3A through 3C may overlap, occur in parallel, occur in a different order, or occur any number of times. Also, various components and functions in FIGS. 3A through 3C may be combined, further subdivided, replicated, or rearranged according to particular needs. In addition, one or more additional components and functions may be included if needed or desired.

Figure 4A:
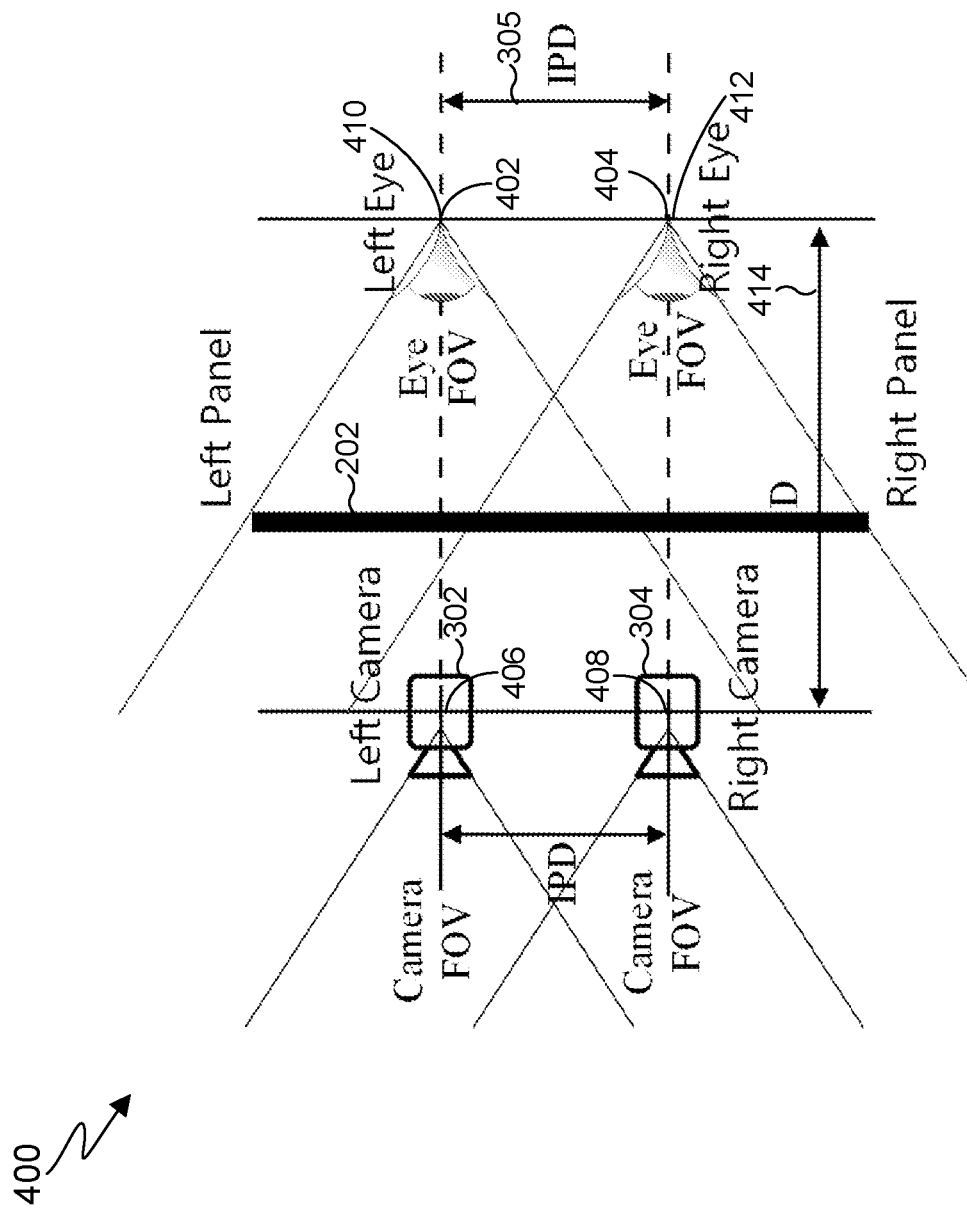
FIGS. 4A and 4B illustrate example viewpoint matching for eye viewpoints, camera viewpoints, and rendering viewpoints in accordance with this disclosure.
Figure 4B:
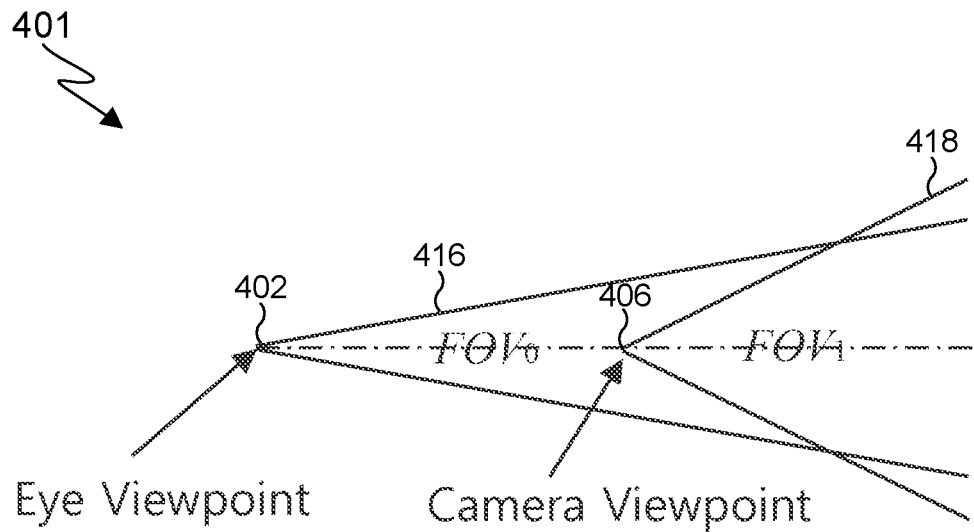

FIGS. 4A and 4B illustrate example viewpoint matching 400 and 401 for eye viewpoints 402 and 404, camera viewpoints 406 and 408, and rendering viewpoints 410 and 412 in accordance with this disclosure. In particular, FIG. 4A illustrates viewpoint matching 400 for eye viewpoints 402 and 404, camera viewpoints 406 and 408, and rendering viewpoints 410 and 412. FIG. 4B illustrates viewpoint matching 401 for a different FOV for an eye viewpoint 402 and a camera viewpoint 406. The viewpoint matching 400 and 401 here represent examples of how the viewpoint matching operation 338 shown in FIG. 3B may be performed.

As shown in FIG. 4A, the viewpoint matching 400 involves determining first and second eye viewpoints 402 and 404, first and second camera viewpoints 406 and 408, and first and second rendering viewpoints 410 and 412. Eye viewpoints 402 and 404 and rendering viewpoints 410 and 412 are differentiated for viewpoints of eyes and viewpoints for rendering images. However, a location of an eye viewpoint is the same as a location of a rendering viewpoint of an image to be presented to a respective eye.

Depth re-projection can be performed to transfer video frames from camera viewpoints 406 and 408 to rendering viewpoints 410 and 412 when a depth 414 changes between the camera viewpoints 406 and 408 and the rendering viewpoints 410 and 412. With a depth reconstruction path, dense depth maps can be obtained for video frames. Depth maps can be used for depth re-projection, which can create undesirable effects, including occlusion areas. The hole filling operation 350 can be used to complete re-projected frames by filling in any holes in the re-projected frames.

As shown in FIG. 4B, when the camera viewpoint 406 and the eye viewpoint 402 are at different depths, an eye FOV 416 is different from a see-through camera FOV 418. The see-through camera FOV 418 can be wider than the eye FOV 416, and information captured by the camera may not be within a view of the eye FOV 416. The content captured by the ultra-wide FOV camera 302 or 304 outside of the eye FOV 416 may not need to be rendered or processed.

Although FIGS. 4A and 4B illustrate examples of viewpoint matching for eye viewpoints, camera viewpoints, and rendering viewpoints, various changes may be made to FIGS. 4A and 4B. For example, the spacing of various components of the viewpoint matching 400 and 401 can vary as needed or desired. Also, the viewpoint matching 400 and 401 may be used in any other suitable video transformation process and are not limited to the specific processes described above.

Figure 5:
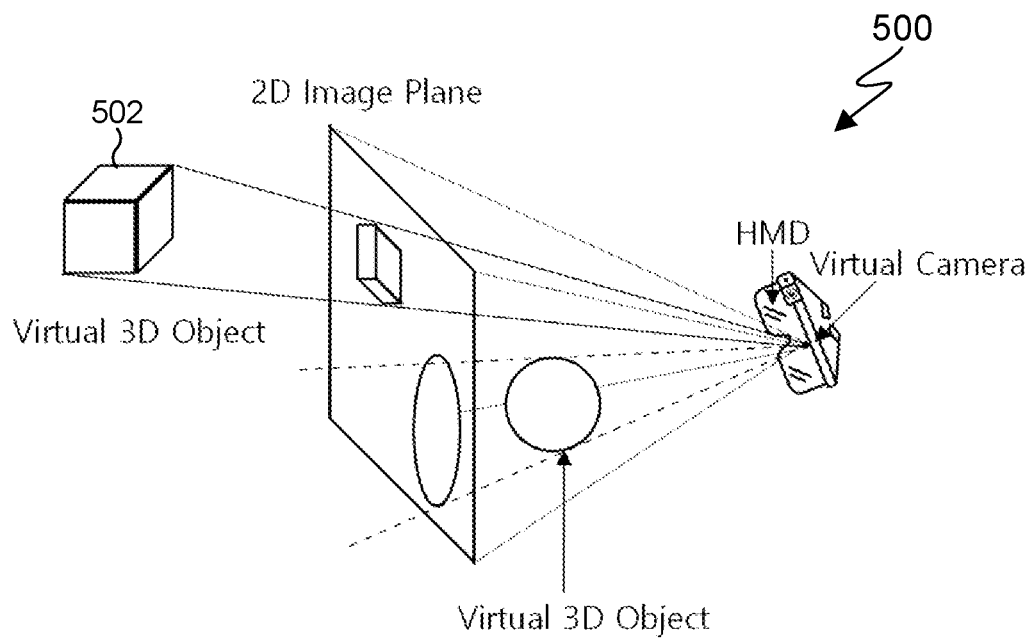
FIG. 5 illustrates an example registration of virtual and real-world objects in accordance with this disclosure.

FIG. 5 illustrates an example registration 500 of virtual and real-world objects in accordance with this disclosure. The registration 500 here represents an example of how the real and virtual object registration operation 322 shown in FIG. 3A may be performed. Note that the registration of virtual objects with real-world objects can also be referred to as object calibration.

As shown in FIG. 5, a location and an orientation of a real-world object can be calculated so that a counterpart virtual object 502 can be placed in a corresponding location and orientation within a virtual world. In some embodiments, a landmark point correspondence procedure can be used for object calibration in which certain real-world objects or landmarks can be identified and tracked over time. In particular embodiments, movements of the real-world objects can be tracked by their virtual shadows, which are corresponding calibrated tracker markers used in object calibration. The virtual objects 502 within the virtual world can be registered with the corresponding real-world counterparts.

Although FIG. 5 illustrates one example of a registration 500 of virtual and real-world objects, various changes may be made to FIG. 5. For example, the sizes and shapes of the individual components of the registration 500 can vary as needed or desired. Also, the number and placement of various components of the registration 500 can vary as needed or desired. In addition, the registration 500 may be used in any other suitable video transformation process and is not limited to the specific processes described above.

FIG. 6 illustrates an example method 600 for image hole filling with existing information and pixel expansion in accordance with this disclosure. The method 600 may, for example, represent operations performed by the hole filling operation 350. For ease of explanation, the method 600 of FIG. 6 is described as being performed using the electronic device 101 in the network confirmation 100 of FIG. 1. However, the method 600 may be performed with any other suitable device and in any other suitable system.

As shown in FIG. 6, the electronic device 101 can obtain one or more video image frames at operation 602. The video image frames can be the first and second images processed in the process 300 through the viewpoint matching operation 338. The video image frames can be captured by one or more cameras, loaded from memory, provided by an external electronic device or server, or otherwise obtained in any other suitable manner. As each video image frame is received, the electronic device 101 can store the video image frame to a video image frame queue at operation 604. The video image frame queue can store a plurality of video image frames that may be used during hole filling for subsequent warped video image frames. In some cases, the video image frame queue can be continuously updated based on newly-received video image frames. Older video image frames can be removed from the video image frame queue based on their time in the queue, receipt of subsequent video image frames being within a device location and orientation threshold, or any other suitable factor. In some embodiments, the video image frames are maintained in the video image frame queue until a viewing session ends.

The electronic device 101 can perform depth warping for a current video image frame at operation 606. The depth warping can correspond to the depth warping operation 344 shown in FIG. 3B. The depth warping transforms the video image frame from a camera viewpoint to a rendering viewpoint. The depth warping operation can also create one or more holes in one or more occlusion areas for which information is not available. The electronic device 101 can perform hole detection and store any detected hole(s) in a hole queue at operation 608. The hole detection can be performed using any suitable technique for determining an area of a depth-warped video image frame that is missing information. In some cases, a location and dimensions of each can be stored in the hole queue, and the holes can be ordered in the holes queue sequentially based on detection time, size, or any other suitable criteria. The electronic device 101 can search previous frames in the video image queue for a pixel patch that corresponds to each hole area at operation 610. A pixel patch is an area of a previous video image frame that contains information missing from a current warped video image frame. The electronic device 101 can search for a pixel patch of a single hole or for any of the holes in the hole queue.

The electronic device 101 can determine whether a pixel patch for a hole is found in operation 612. In some cases, the search for a pixel patch in the video image frame queue can be limited to matching positions and orientations of the current video image frame and video image frames in the video image frame queue. For example, in some embodiments, the electronic device 101 can determine a location of a hole in a video image frame based on the location and orientation information of the electronic device 101 at a time of capture. The location of the hole can be compared to location and orientation information of the electronic device 101 for each of the video image frames stored in the video image frame queue in order to determine the potential that the missing information is included in any of the stored previous video image frames.

When a pixel patch for a hole area is found in a previous image frame, the electronic device 101 can fill the hole in the current video image frame using the pixel patch in operation 614. For example, the missing information in a warped video image frame can be supplemented with information found in a previous video image frame stored in the video image frame queue. When a pixel patch for a hole area is not found in a previous video image frame, the electronic device 101 can perform pixel expansion on the hole area in operation 616. Pixel expansion can use pixels surrounding a hole area to estimate pixel information for the hole area. In embodiments where the search for a pixel patch in a previous frame is performed simultaneously for all hole areas in the hole queue, the electronic device 101 can process remaining holes in the hole queue using pixel expansion.

The electronic device 101 can determine whether all holes are filled in operation 618. When a hole is filled by pixel expansion or patch replacement, the electronic device 101 can remove a respective hole from the hole queue. The electronic device 101 can check the hole queue for remaining holes. When the hole queue includes at least one hole, the electronic device 101 can perform operation 608 to select another hole. When the hole queue is empty, the electronic device 101 can obtain a hole-filled video frame in operation 620.

Although FIG. 6 illustrates one example of a method 600 for image hole filling with existing information and pixel expansion, various changes may be made to FIG. 6. For example, while shown as a series of steps, various steps in FIG. 6 may overlap, occur in parallel, occur in a different order, or occur any number of times.

Figure 7:
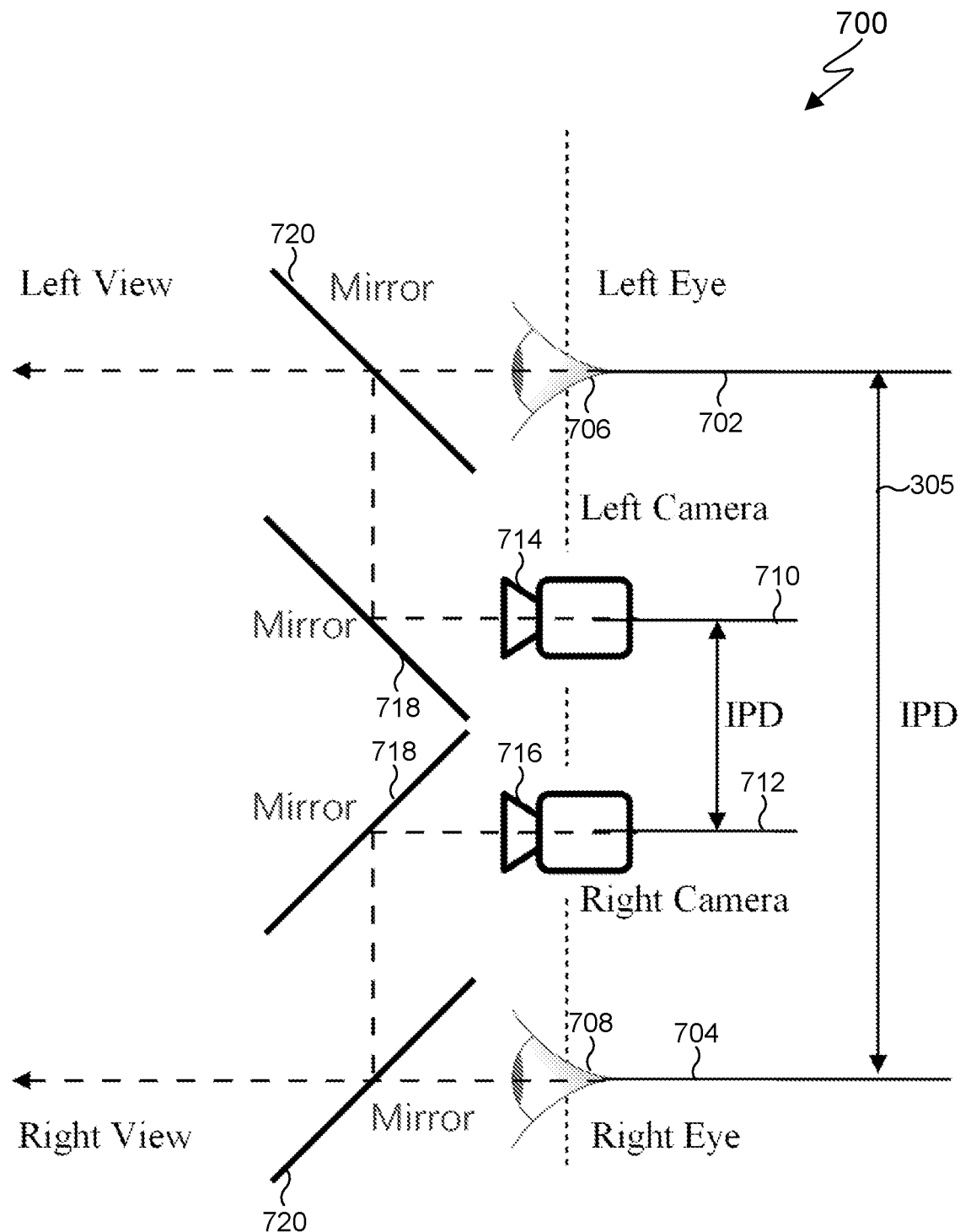
FIG. 7 illustrates an example arrangement with see-through cameras and eyes having a same view in accordance with this disclosure.

FIG. 7 illustrates an example arrangement 700 with see-through cameras and eyes having a same view in accordance with this disclosure. As shown in FIG. 7, a video transformation for VSTAR can be extended to embodiments in which optical axes 702 and 704 of eyes 706 and 708 are not in-line with optical axes 710 and 712 of camera 714, 716.

For embodiments with at least two cameras including at least one misaligned camera, a rendering frame at a rendering viewpoint can have contributions determined from each of the at least two cameras. In some embodiments, camera viewpoints that provided repetitive or less useful information are assigned a lower contribution than other camera viewpoints. Also, a camera viewpoint can be assigned a contribution of zero if the camera viewpoint is not used for the development of the rendering frame. For embodiments with a single camera, video image frames captured by the single camera can be used for both of the first and second rendering frames.

In some embodiments, one or more mirrors 718 and one or more beam splitters 720 can be used to align the optical axes 710 and 712 of the cameras 714 and 716 to the optical axes 702 and 704 of the eyes 706 and 708. For example, the mirror(s) 718 can be implemented to reflect the optical axis 710 of the camera 714 to perpendicularly intersect the optical axis 702 of the eye 706. The beam splitter(s) 720 can be positioned proximate to the intersection point of the reflected optical axis 710 of the camera 714 and the optical axis 702 of the eye 706. The beam splitter(s) 720 can be oriented at an angle to reflect the reflected optical axis 710 of the camera 714 into alignment with the optical axis 702 of the eye 706 passing through the beam splitter 720.

Although FIG. 7 illustrates one example of an arrangement 700 with see-through cameras and eyes having a same view, various changes may be made to FIG. 7. For example, the number, spacing, and placement of various components of the arrangement 700 can vary as needed or desired. Also, the example arrangement 700 may be used in any other suitable video transformation process and is not limited to the specific processes described above.

Figure 8:
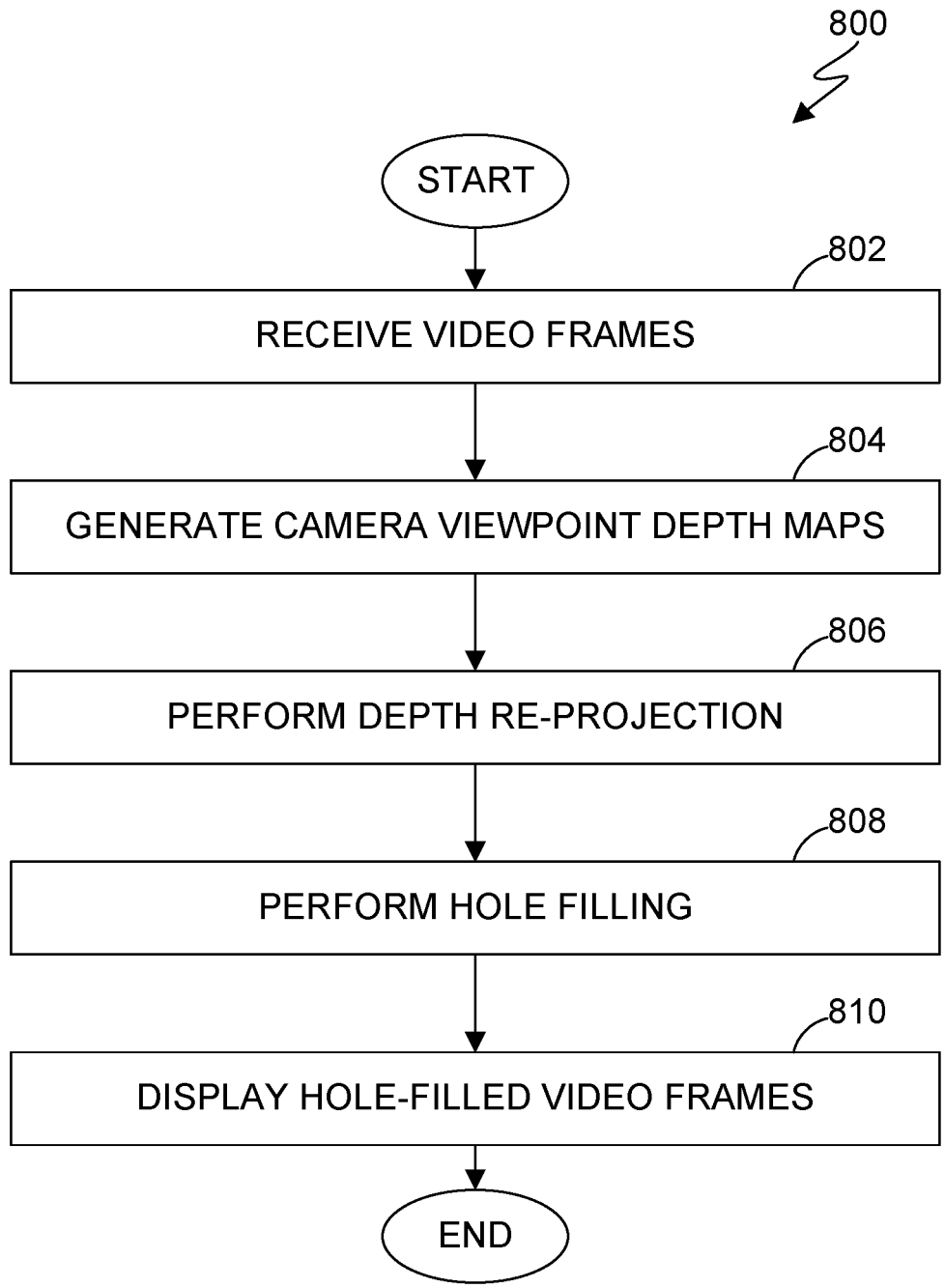
FIG. 8 illustrates an example method for video transformation of video see-through AR according to this disclosure.

FIG. 8 illustrates an example method 800 for video transformation of video see-through AR according to this disclosure. For ease of explanation, the method 800 of FIG. 8 is described as being performed using the electronic device 101 in the network configuration 100 of FIG. 1. However, the method 800 may be performed with any other suitable device and in any other suitable system.

As shown in FIG. 8, the electronic device 101 can receive video frames from a plurality of cameras coupled to the electronic device 101 at operation 802. Each video frame can be associated with position data, such as position data captured by an IMU of the electronic device 101 or received by an IMU communicatively coupled with the electronic device 101. The electronic device 101 can generate camera viewpoint depth maps associated with the video frames based on the video frames and the position data at operation 804. For example, the depth maps can be generated based on a sparse depth reconstruction and a dense depth reconstruction.

The electronic device 101 can perform depth re-projection to transform the video frames from camera viewpoints to rendering viewpoints using the camera viewpoint depth maps at operation 806. For example, the electronic device 101 can detect positions of eyes of a user viewing the electronic device 101 relative to a plurality of displays of the electronic device 101, where the rendering viewpoints are based on the detected positions of the eyes of the user. In some cases, the electronic device 101 can determine rendering viewpoint depth maps corresponding to the transformed video frames from the camera viewpoint depth maps based on the detected positions of the eyes of the user.

The electronic device 101 can perform hole filling on the transformed video frames for one or more holes created in one or more occlusion areas during the depth re-projection at operation 808. In some cases, each hole can be detected based on a rendering viewpoint depth map. The hole filling can include the electronic device 101 determining one or more hole areas for one or more holes in the transformed video frames, where each hole area corresponds to an area of missing image data in the transformed video frames. The hole filling can also include the electronic device 101, for each identified hole area, determining whether a previous frame includes a pixel patch corresponding to the determined hole area and (if so) filling the determined hole area with the pixel patch. The hole filling can further include the electronic device 101, for each identified hole area, filling in the hole area via pixel expansion when no previous frame includes a pixel patch corresponding to the hole area.

The electronic device 101 can display the hole-filled video frames on the plurality of displays coupled to the electronic device 101 at operation 810. For example, the video frames can contain virtual objects introduced into a real-world scene. As particular examples, a first video frame can be generated at a first rendering viewpoint corresponding to a first eye of the user, and a second video frame can be generated at a second rendering viewpoint corresponding to a second eye of the user.

Although FIG. 8 illustrates one example of a method 800 for video transformation of video see-through AR, various changes may be made to FIG. 8. For example, while shown as a series of steps, various steps in FIG. 8 may overlap, occur in parallel, occur in a different order, or occur any number of times.

Although this disclosure has been described with example embodiments, various changes and modifications may be suggested to one skilled in the art. It is intended that this disclosure encompass such changes and modifications as fall within the scope of the appended claims.

What is claimed is:

1. A method of video transformation for a video see-through (VST) augmented reality (AR) device, the method comprising:
   obtaining video frames from multiple cameras associated with the VST AR device, wherein each video frame is associated with position data;
   generating camera viewpoint depth maps associated with the video frames based on the video frames and the position data;
   performing depth re-projection to transform the video frames from camera viewpoints to rendering viewpoints using the camera viewpoint depth maps;
   determining one or more hole areas for one or more holes created by one or more occlusions areas in at least one of the transformed video frames during the depth re-projection, the one or more hole areas corresponding to one or more areas of missing image data in the at least one transformed video frame;
   performing hole filling of the one or more holes of the at least one transformed video frame to generate at least one hole-filled video frame, wherein performing the hole filling comprises, for each determined hole area, determining whether a previous frame includes a pixel patch corresponding to the determined hole area and, if so, filling the determined hole area based on the pixel patch; and
   displaying the at least one transformed video frame including the at least one hole-filled video frame on multiple displays associated with the VST AR device.

2. The method of claim 1, wherein performing the hole filling further comprises, for each determined hole area:
   if it is determined that the previous frame does not include the pixel patch corresponding to the determined hole area, filling the determined hole area using pixel expansion.

3. The method of claim 1, further comprising:
   detecting positions of eyes of a user viewing the VST AR device relative to the displays of the VST AR device;
   wherein the rendering viewpoints are based on the detected positions of the eyes of the user.

4. The method of claim 3, further comprising:
   determining rendering viewpoint depth maps corresponding to the at least one transformed video frame based on the detected positions of the eyes of the user.

5. The method of claim 4, further comprising:
   detecting the one or more holes created in the one or more occlusion areas of the at least one transformed video frame based on the rendering viewpoint depth maps.

6. The method of claim 1, further comprising:
   determining an area and a location for each of the determined one or more hole areas; and
   storing the area and the location for each of the determined one or more hole areas in order based on a detection time.

7. The method of claim 6, wherein an order in which the one or more holes are filled is based on at least one of the detection time or a size of a specified one of the one or more holes.

8. A video see-through (VST) augmented reality (AR) device comprising:
   multiple cameras; and at least one processing device configured to:
obtain video frames from the cameras, wherein each video frame is associated with position data;
generate camera viewpoint depth maps associated with the video frames based on the video frames and the position data;
perform depth re-projection to transform the video frames from camera viewpoints to rendering viewpoints using the camera viewpoint depth maps;
determine one or more hole areas for one or more holes created by one or more occlusions areas in at least one of the transformed video frames during the depth re-projection, the one or more hole areas corresponding to one or more areas of missing image data in the at least one transformed video frame;
perform hole filling of the one or more holes of the at least one transformed video frame to generate at least one hole-filled video frame, wherein, to perform the hole filling, the at least one processing device is configured, for each determined hole area, to determine whether a previous frame includes a pixel patch corresponding to the determined hole area and, if so, fill the determined hole area based on the pixel patch; and
initiate display of the at least one transformed video frame including the at least one hole-filled video frame on multiple displays associated with the VST AR device.

9. The VST AR device of claim 8, wherein, to perform the hole filling, the at least one processing device is further configured, for each determined hole area, to:
if it is determined that the previous frame does not include the pixel patch corresponding to the determined hole area, fill the determined hole area using pixel expansion.

10. The VST AR device of claim 8, wherein:
the at least one processing device is further configured to detect positions of eyes of a user viewing the VST AR device relative to the displays of the VST AR device; and
the rendering viewpoints are based on the detected positions of the eyes of the user.

11. The VST AR device of claim 10, wherein the at least one processing device is further configured to determine rendering viewpoint depth maps corresponding to the at least one transformed video frame based on the detected positions of the eyes of the user.

12. The VST AR device of claim 11, wherein the at least one processing device is further configured to detect the one or more holes created in the one or more occlusion areas of the at least one transformed video frame based on the rendering viewpoint depth maps.

13. The VST AR device of claim 8, wherein the at least one processing device is further configured to:
determine an area and a location for each of the determined one or more hole areas; and
store the area and the location for each of the determined one or more hole areas in order based on a detection time.

14. The VST AR device of claim 13, wherein an order in which the one or more holes are filled is based on at least one of the detection time or a size of a specified one of the one or more holes.

15. A non-transitory machine readable medium containing instructions that when executed cause at least one processor of a video see-through (VST) augmented reality (AR) device to:

obtain video frames from multiple cameras associated with the VST AR device, wherein each video frame is associated with position data;
generate camera viewpoint depth maps associated with the video frames based on the video frames and the position data;
perform depth re-projection to transform the video frames from camera viewpoints to rendering viewpoints using the camera viewpoint depth maps;
determine one or more hole areas for one or more holes created by one or more occlusions areas in at least one of the transformed video frames during the depth re-projection, the one or more hole areas corresponding to one or more areas of missing image data in the at least one transformed video frame;
perform hole filling of the one or more holes of the at least one transformed video frame to generate at least one hole-filled video frame, wherein the instructions that when executed cause the at least one processor to perform the hole filling comprise instructions that when executed cause the at least one processor, for each determined hole area, to determine whether a previous frame includes a pixel patch corresponding to the determined hole area and, if so, fill the determined hole area based on the pixel patch; and
initiate display of the at least one transformed video frame including the at least one hole-filled video frame on multiple displays associated with the VST AR device.

16. The non-transitory machine readable medium of claim 15, wherein the instructions that when executed cause the at least one processor to perform the hole filling further comprise instructions that when executed cause the at least one processor, for each determined hole area, to:
if it is determined that the previous frame does not include the pixel patch corresponding to the determined hole area, fill the determined hole area using pixel expansion.

17. The non-transitory machine readable medium of claim 15, further containing instructions that when executed cause the at least one processor to detect positions of eyes of a user viewing the VST AR device relative to the displays of the VST AR device;
wherein the rendering viewpoints are based on the detected positions of the eyes of the user.

18. The non-transitory machine readable medium of claim 17, further containing instructions that when executed cause the at least one processor to:
determine rendering viewpoint depth maps corresponding to the at least one transformed video frame based on the detected positions of the eyes of the user; and
detect the one or more holes created in the one or more occlusion areas of the at least one transformed video frame based on the rendering viewpoint depth maps.

19. The non-transitory machine readable medium of claim 15, further containing instructions that when executed cause the at least one processor to:
determine an area and a location for each of the determined one or more hole areas; and
store the area and the location for each of the determined one or more hole areas in order based on a detection time.

20. The non-transitory machine readable medium of claim 19, wherein an order in which the one or more holes are filled is based on at least one of the detection time or a size of a specified one of the one or more holes.

* * * * *